United States Patent Office 3,517,086
Patented June 23, 1970

3,517,086
NUCLEATED BLEND OF POLYPROPYLENE, POLYETHYLENE, AND ETHYLENE/PROPYLENE COPOLYMER
Kenzo Shirayama and Tadakatsu Kitamura, Niihama-shi, Japan, assignors to Sumitomo Chemical Company, Ltd., Osaka, Japan, a corporation of Japan
No Drawing. Filed Jan. 23, 1967, Ser. No. 610,737
Int. Cl. C08f 37/18
U.S. Cl. 260—897                                   15 Claims

ABSTRACT OF THE DISCLOSURE

Polypropylene composition excellent in impact strength, rigidity and in transparency consisting of a ternary mixture of 65–96% by weight of crystalline polypropylene, 2–30% by weight of solid polyethylene, and 2–20% by weight of a substantially amorphous ethylene-propylene copolymer, and 0.01–5 parts by weight per 100 parts of the ternary mixture of an aromatic sulfonic acid compound or an organic carboxylic acid compound.

---

Polypropylene has many such characteristics that it is excellent in mechanical properties such as rigidity and hardness and is high in softening temperature, and that molded articles thereof are excellent in surface lustre. It is therefore highly evaluated as a molding resin. Due to its high crystallinity, however, polypropylene has the drawback that it is not sufficient in impact strength and in transparency.

For the improvement in impact strength of polypropylene, there have widely been adopted processes in which polypropylene is incorporated with polyethylene and a rubbery substance such as polyisobutylene, polybutadiene or amorphous ethylene-propylene copolymer. However, the incorporation of the above substances results in fresh occurrence of such drawbacks that polypropylene is damaged in rigidity and hardness inherent thereto and becomes opaque.

Japanese patent publication Nos. 1,809/64 and 1,652/65 propose an attempt in which polypropylene or a mixture of polypropylene and a rubbery substance is incorporated with a nucleating agent comprising an organic carboxylic acid or its metal salt, thereby improving the impact resistance of the polypropylene composition while maintaining the rigidity thereof. It is also known according to Japanese patent publication No. 18,746/64 that a ternary mixture comprising polypropylene and, kneaded therewith, polyethylene having a density of not less than 0.93 and an amorphous ethylene-propylene copolymer or polyisobutylene is effectively improved in impact strength.

The present inventors have made various studies on the improvement of polypropylene composition and have now found that a polypropylene composition greatly improved in impact resistance and rigidity and having transparency can be obtained by adding to a ternary mixture comprising 65–96% by weight of polypropylene having a melt index of 10 or less, preferably 2 or less under a load of 2160 g. at 230° C. 2–30% by weight of polyethylene and 2–20% by weight of an amorphous ethylene-propylene copolymer, 0.01–5% by weight based on the amount of a mixture of a nucleating agent comprising an aromatic sulfonic acid compound or its metal salt, or an organic carboxylic acid compound or its metal salt. The present invention is based on the above discovery and provide such polypropylene composition.

A characteristic of the present invention is that when a nucleating agent is added to a ternary mixture comprising definite amounts of polypropylene and amorphous ethylene-propylene copolymer and polyethylene, a great improvement in impact strength of the mixture is observed as compared with the case where the nucleating agent is added to a binary mixture comprising the same amounts of polypropylene and amorphous ethylene-propylene copolymer or polyethylene.

Another characteristic of the present invention is that in order to attain a high impact strength by adding a nucleating agent to a binary mixture comprisig polypropylene and a modifier such as polyethylene or rubbery substance, the modifier is required to be used in large quantities, whereas in the case of the composition of the present invention, the addition of a relatively small amount of modifier is sufficient in order to attain a high impact strength of the same extent as above. That is, in the case of the present composition, a high impact strength can be attained without losing the excellent properties, e.g. high rigidity, of polypropylene.

A further characteristic of the present invention is that the ternary mixture comprising polypropylene, polyethylene and an amorphous ethylene-propylene copolymer is excellent in transparency as compared with a binary mixture comprising polypropylene and a modifier. Such a ternary mixture can further be improved in transparency by addition of a nucleating agent.

A still further characteristic of the present invention is that a considerable portion of the modifier to be incorporated in order to attain a high impact strength can be replaced by polyethylene, which is less expensive than a rubbery substance, whereby a high economical value can be attained.

Polypropylene to be used in the present invention is one prepared in the presence of a Ziegler-Natta type catalyst. It is a substantially crystalline polypropylene composed mainly of propylene containing at least 50% by weight of an isotactic portion, and has a melt index of about 10 or less, preferably 2 or less, at 230° C. under a load of 2160 g. Examples of such crystalline polypropylene are crystalline propylene homopolymers and crystalline propylene-ethylene copolymers. This polypropylene should be contained in the ternary mixture in an amount of 65–96%, preferably 75–85%, by weight based on the amount of the mixture.

Polyethylene employed in the present invention is a polymer composed mainly of ethylene. It is possible to use any polyethylene so far as it is substantially an ethylene polymer ordinarily called as low density or high density polyethylene. Particularly, the use of low density polyethylene is preferable. The polyethylene should be contained in said ternary mixture in an amount 2–30%, preferably 5–20%, by weight based on the amount of the mixture.

Amorphous ethylene-propylene copolymer to be used in the present invention is a substantially hot-heptane-soluble polymer prepared by polymerizing a mixed gas of ethylene and propylene in the presence of a so-called Ziegler-Natta type catalyst. It contains 10–70 mol percent on average of bonded ethylene and has a degree of crytallinity of up to 35%.

Such amorphous ethylene-propylene copolymer is an ethylene-propylene rubber containing, in some cases, a third monomer component (EPR or EPT), or a substantially hot-heptane-soluble component by-produced in preparing a crystalline ethylene-propylene copolymer, or a crystalline ethylene-propylene block copolymer. The above-mentioned crystalline ethylene-propylene block copolymer is one prepared by first polymerizing propylene and then introducing, at the latter stage of the polymerization, a mixed gas of ethylene and propylene, thereby forming an ethylene-propylene copolymer on a polypropylene formed at the first stage of the polymerization.

The amorphous ethylene-propylene copolymer to be used in the present invention should have an intrinsic viscosity of at least 1.5, preferably at least 2.0, more preferably at least 2.5, as measured in tetralin solution at 135° C.

The amorphous ethylene-propylene copolymer should be contained in said ternary mixture in an amount of 2–20%, preferably 5–15%, by weight based on the amount of the mixture.

The above-mentioned amount ranges of polypropylene, polyethylene and amorphous ethylene-propylene copolymer and the melt index range of polypropylene are critical, and the aforesaid characteristics of the present invention cannot be displayed if the values are less than the lower limits or more than the upper limits of said ranges.

The additives, i.e. nucleating agents to be used in the present invention include aromatic sulfonic acids having sulfonic acid groups on the aromatic rings, such as benzenesulfonic and naphthalenesulfonic acids; aromatic sulfonic acid compounds in which at least one hydrogen atom on said aromatic rings has been substituted by at least one halogen or alkyl, alkoxyl, nitro, amino or hydroxyl group; and their salts of metals of Groups I, II and III of the Periodic Table. In view of the stability of polypropylene, however, Na, Mg, Ca and Al metal salts of aromatic sulfonic acids are particularly preferable. Of the above aromatic sulfonic acid salts, particularly effective are, for example, Na, Mg, Ca and Al salts of α-naphthalenesulfonic acid, Na salt of 8-amino-naphthalenesulfonic acid, Na, Mg, Ca and Al salts of benzenesulfonic acid, Ca and Mg salts of 2,5-dichlorobenzenesulfonic acid, and Ca and Mg salts of m-xylenesulfonic acid.

In addition to the above-mentioned aromatic sulfonic acid compounds, there may also be used as the nucleating agents in the present invention, the organic carboxylic acids or metal salts thereof described in Japanese patent publication Nos. 1,809/64, 14,062/64 and 1,652/65, and in Belgian Pat. Nos. 631,471, 633,715, 633,716 and 633,717, or the nucleating agents set forth in Japanese patent publication Nos. 27,637/64 and 18,854/65 which are composed of phthalic anhydride and carboxylic acid salts, carboxylic acids or anhydrides thereof and aluminum phosphate or inorganic and organic aluminum compounds.

Concretely, the nucleating agents include succinic, glutaric, adipic, monophenylacetic, diphenylacetic, p-isopropylbenzoic, p-tertiary butyl-benzoic and o-tertiary butyl-benzoic acids, and Li, Na, Mg, Ca, Ba, Al, Ti and Cr salts of said acids. These nucleating agents may be used either alone or in admixture of 2 or more. The above nucleating agents are used in an amount of 0.01–5 parts, preferably 0.05–5 parts, more preferably 0.1–1 part, by weight per 100 parts of said ternary mixture comprising polypropylene, polyethylene and amorphous ethylene-propylene copolymer.

The mixing of the components of the mixture can be easily effected by simultaneously kneading the components in a molten state using, ordinarily, such a mixing means as a hot roll, extruder or Banbury mixer. The incorporation of the nucleating agent may also be effected according to such a procedure that it is dispersed in the polymers by use of a suitable dispersing assistant. A concrete mixing procedure is such that the two components polyethylene and ethylene-propylene copolymer are simultaneously incorporated into a mixture of polypropylene and nucleating agent thoroughly kneaded on a hot roll or the like. Alternatively, a mixture of said two components previously kneaded may be incorporated into the mixture of polypropylene and nucleating agent. The temperature necessary for the mixing is 160°–190° C., and a mixing time of 5 to 20 minutes is sufficient. Further, in the course of mixing the above components, there may be incorporated small amounts of other additives than said fundamental components, such as stabilizers, antioxidants, auxiliary agents, pigments and the like.

The following examples illustrate the present invention further in detail but should not be construed as limiting the scope of the invention.

EXAMPLE 1

To crystalline polypropylene prepared in the presence of a Ziegler-Natta catalyst and having an intrinsic viscosity ($\eta$) of 2.66 in tetraline solution at 135° C.; an isotactic index of 95%; and a melt index of 0.85 at 230° C. under a load of 2160 g., was added a methanol solution containing as an antioxidant a mixture of 0.2% based on the total polymer of dilaurylthiodipropionate and 0.04% of 1,1,3-tri-(2-methyl-4-hydroxy-5-tertiary butyl-phenyl)-butane, and as a nucleating agent, 0.5% based on the total polymer of sodium benzenesulfonate (anhydrous). After vaporizing the methanol, the mixture was melted on a mixing roll at 190° C. and was mixed in proportions as shown in Table 1 with polyethylene and an amorphous ethylene-propylene copolymer obtained as a hot heptane-soluble portion in preparing a crystalline ethylene-propylene block copolymer, and the mixture was kneaded for 10 minutes. From the kneaded mixture, sheets of 4 mm. and 1 mm. in thickness were prepared and were subjected to impact test and stiffness test respectively. The impact test was effected according to Izod method of ASTM D–256–56, using three 4 mm. sheets in piles. The stiffness test was carried out according to ASTM D–747–63, using a 1 mm. sheet. The results obtained were as shown in Table 1.

TABLE 1

| Run No. | Ternary mixture (wt. percent) | | | Sodium benzene sulfonate, PHR | Izod impact strength, kg. cm./cm.² (20° C.) | Stiffness, kg./cm.² (20° C.) | Transparency [3] |
|---|---|---|---|---|---|---|---|
| | Polypropylene | Polyethylene [1] | Amorphous ethylene-propylene copolymer [2] | | | | |
| 1 | 100 | 0 | 0 | 0 | 2.9 | 12,700 | |
| 2 | 100 | 0 | 0 | 0.5 | 2.9 | 13,900 | Excellent. |
| 3 | 90 | 10 | 0 | 0 | 3.3 | 11,900 | Same. |
| 4 | 90 | 10 | 0 | 0.5 | 3.6 | 13,000 | Excellent. |
| 5 | 90 | 5 | 5 | 0 | 5.0 | 11,500 | Favorable. |
| 6 | 90 | 5 | 5 | 0.5 | 7.8 | 12,700 | Excellent. |
| 7 | 90 | 0 | 10 | 0 | 4.2 | 10,100 | Poor. |
| 8 | 90 | 0 | 10 | 0.5 | 6.1 | 11,500 | Do. |
| 41 | 85 | 15 | 0 | 0 | 2.7 | 10,700 | Same. |
| 42 | 85 | 15 | 0 | 0.5 | 3.0 | 12,300 | Favorable. |
| 43 | 85 | 10 | 5 | 0 | 5.8 | 10,700 | Same. |
| 44 | 85 | 10 | 5 | 0.5 | [4] 37.7 | 11,400 | Favorable. |
| 45 | 85 | 7.5 | 7.5 | 0 | 7.9 | 9,500 | Same. |
| 46 | 85 | 7.5 | 7.5 | 0.5 | [4] 41.6 | 11,700 | Favorable. |
| 47 | 85 | 5 | 10 | 0 | 8.3 | 10,100 | Same. |
| 48 | 85 | 5 | 10 | 0.5 | 18.8 | 12,100 | Somewhat favorable. |
| 49 | 85 | 0 | 15 | 0 | 5.1 | 9,300 | Poor. |
| 50 | 85 | 0 | 15 | 0.5 | 7.5 | 10,200 | Do. |
| 9 | 80 | 20 | 0 | 0 | 2.5 | 9,500 | Same. |
| 10 | 80 | 20 | 0 | 0.5 | 2.8 | 11,800 | Favorable. |
| 11 | 80 | 15 | 5 | 0 | 6.8 | 9,600 | Same. |
| 12 | 80 | 15 | 5 | 0.5 | [4] 15.7 | 10,900 | Excellent. |
| 13 | 80 | 10 | 10 | 0 | 8.6 | 10,200 | Same. |
| 14 | 80 | 10 | 10 | 0.5 | [4] 52.2 | 11,500 | Favorable. |
| 15 | 80 | 5 | 15 | 0 | 10.5 | 9,400 | Poor. |
| 16 | 80 | 5 | 15 | 0.5 | [4] 38.3 | 11,000 | Do. |
| 17 | 80 | 0 | 20 | 0 | 6.1 | 8,600 | Do. |
| 18 | 80 | 0 | 20 | 0.5 | 8.5 | 9,200 | Do. |
| 51 | 75 | 25 | 0 | 0 | 2.6 | 9,000 | Same. |
| 52 | 75 | 25 | 0 | 0.5 | 2.8 | 1,100 | Favorable. |
| 53 | 75 | 20 | 5 | 0 | 9.2 | 8,800 | Same. |
| 54 | 75 | 20 | 5 | 0.5 | [4] 28.7 | 10,700 | Favorable. |
| 55 | 75 | 15 | 10 | 0 | [4] 23.7 | 8,500 | Same. |
| 56 | 75 | 15 | 10 | 0.5 | [4] 52.4 | 10,200 | Favorable. |
| 57 | 75 | 10 | 15 | 0 | [4] 43.2 | 8,600 | Somewhat poor. |
| 58 | 75 | 10 | 15 | 0.5 | [4] 59.5 | 9,800 | Do. |
| 59 | 75 | 5 | 20 | 0 | [4] 19.1 | 8,300 | Poor. |
| 60 | 75 | 5 | 20 | 0.5 | [4] 50.2 | 10,000 | Do. |
| 61 | 75 | 0 | 25 | 0 | 9.0 | 7,900 | Do. |
| 62 | 75 | 0 | 25 | 0.5 | 14.5 | 8,800 | Do. |
| 19 | 70 | 30 | 0 | 0 | 2.8 | 8,300 | Somewhat favorable. |
| 20 | 70 | 30 | 0 | 0.5 | 2.8 | 10,800 | Favorable. |
| 21 | 70 | 20 | 10 | 0 | [4] 47.3 | 7,700 | Same. |
| 22 | 70 | 20 | 10 | 0.5 | [4] 65.0 | 9,500 | Favorable. |
| 23 | 70 | 0 | 30 | 0 | 13.8 | 7,400 | Poor. |
| 24 | 70 | 0 | 30 | 0.5 | [4] 24 | 8,400 | Do. |

[1] Low density polyethylene having a density of 0.92 and a melt index of 1.6 at 190° under a load of 2160 g.
[2] The copolymer had an ethylene content of 8.5% by weight and an intrinsic viscosity ($\eta$) of 2.78 in tetraline solution at 135° C.
[3] Visual comparison with the polypropylene sheet of Run No. 1.
[4] In the destruction, the test piece did not peel off.

As seen in Table 1, it is clear that by addition of sodium benzenesulfonate, the polypropylene mixtures are improved in Izod impact strength as compared with the controls to which no said salt has been added, and the effect is marked particularly in the case of the ternary mixtures. Further, in the above case, improvements are observed in stiffness and transparency, as well.

EXAMPLE 2

Using the same polypropylene and amorphous ethylene-propylene copolymer as in Example 1 and polyethylenes different in melt index and density in proportions of 80 parts, 10 parts and 10 parts, respectively, the same tests as in Example 1 were effected to obtain the results as shown in Table 2.

TABLE 2

| Run No. | Kind of polyethylene | Melt index | Density | Sodium benzene-sulfonate | Izod impact strength, kg. cm./cm.² (20° C.) | Stiffness, kg./cm.² (20° C.) |
|---|---|---|---|---|---|---|
| 13 | Low density polyethylene | 1.6 | 0.92 | 0 | 8.6 | 10,200 |
| 14 | do | 1.6 | 0.92 | 0.5 | [1] 52.2 | 11,500 |
| 25 | do | 7 | 0.92 | 0 | 10.0 | 9,100 |
| 26 | do | 7 | 0.92 | 0.5 | [1] 56.6 | 10,300 |
| 27 | do | 20 | 0.92 | 0 | 10.3 | 9,300 |
| 28 | do | 20 | 0.92 | 0.5 | [1] 47.8 | 11,000 |
| 29 | do | 50 | 0.92 | 0 | 10.1 | 9,500 |
| 30 | do | 50 | 0.92 | 0.5 | [1] 24.5 | 11,200 |
| 31 | High density polyethylene (Marlex) | 0.9 | 0.96 | 0 | 10.1 | 10,100 |
| 32 | do | 0.9 | 0.96 | 0.5 | 23.9 | 11,100 |

[1] In the destruction, the test piece did not peel off.

EXAMPLE 3

Employing various nucleating agents and using the same polypropylene, polyethylene and amorphous ethylene-propylene copolymer as in Example 1 in proportions of 80 parts, 10 parts and 10 parts, respectively, the same tests as in Example 1 were effected to obtain the results as shown in Table 3.

TABLE 3

| Run No. | Nucleating agent Kind | Amounts, PHR | Izod impact strength, kg.-cm./cm.$^2$ (20° C.) | Stiffness, kg./cm.$^2$ (20° C.) |
|---|---|---|---|---|
| 13 | | 0 | 8.6 | 10,200 |
| 14 | Sodium benzesulfonate | 0.5 | [1] 52.2 | 11,500 |
| 33 | p-Tert. butyl benzoic aicd | 0.5 | [1] 41.3 | 11,000 |
| 34 | Aluminum p-tert- butyl benzoate | 0.5 | [1] 41.6 | 11,600 |
| 35 | Adipic acid | 0.5 | [1] 52.4 | 10,500 |
| 36 | {Phthalic anhydride | 0.1 | [1] 50.3 | 10,400 |
|    | {Calcium sterate | 0.2 | | |

[1] In the destruction, the test piece did not peel off.

EXAMPLE 4

Using the same polypropylene, polyethylene and amorphous ethylene-propylene copolymer as in Example 1 in proportions 80 parts, 10 parts and 10 parts, respectively and varying the amount of the nucleating agent sodium benzenesulfonate, the same tests as in Example 1 were effected to obtain the results as set out in Table 4.

TABLE 4

| Run No. | Amount of sodium benzene sulfonate, PHR | Izod impact strength, kg. cm./cm.$^2$ (20° C.) | Stiffness, kg./cm.$^2$ (20° C.) |
|---|---|---|---|
| 37 | 1 | [1] 17.2 | 11,100 |
| 14 | 0.5 | [1] 52.2 | 11,500 |
| 38 | 0.2 | [1] 38.3 | 10,900 |
| 39 | 0.1 | [1] 56.7 | 11,000 |
| 40 | 0.05 | [1] 57.4 | 10,900 |
| 13 | 0 | 8.6 | 10,200 |

[1] In the destruction, the test piece did not peel off.

EXAMPLE 5

Using the same polypropylene and polyethylene as in Example 1 and employing as amorphous ethylene-propylene copolymer Dutral-P (an ethylene-propylene rubber having an intrinsic viscosity ($\eta$) of 1.38 and an ethylene content of 38.4 mol percent, a product of Montecatini), the same tests as in Example 1 were effected to obtain the results as shown in Table 5.

What we claim is:

1. A polypropylene composition having a high impact strength and rigidity in combination with transparency which comprises a ternary mixture composed of 70 to 90% by weight of a crystalline polypropylene having a melt index up to 10 at 230° C. under a load of 2160 g.; 5 to 20% by weight of a normally solid polyethylene; and 5 to 20% by weight of a substantially amorphous ethylene-propylene copolymer containing 10 to 70 mole percent on the average of bonded ethylene and having a degree of crystallinity of up to 35% and an intrinsic viscosity of at least 1.5 in tetralin at 135° C., and 0.05 to 1 part by weight, per 100 parts by weight of said ternary mixture, of at least one nucleating agent selected from the group consisting of aromatic sulfonic acid compounds and organic carboxylic acid compounds.

2. A polypropylene composition according to claim 1, wherein the polypropylene is prepared in the presence of a Ziegler-Natta type catalyst and is composed mainly of propylene containing at least 50% by weight of an isotactic portion.

3. A polypropylene composition according to claim 1, wherein the polyethylene is a polymer composed mainly of ethylene and is selected from the group consisting of high density polyethylene and low density polyethylene.

4. A polypropylene composition according to claim 1, wherein the polyethylene is low density polyethylene.

5. A polypropylene composition according to claim 1, wherein the ethylene-propylene copolymer is a substantially hot-heptane-soluble polymer prepared by polymerizing a mixed gas of ethylene and propylene in the presence of a Ziegler-Natta type catalyst.

6. A polypropylene composition according to claim 1, wherein the nucleating agent is selected from the group

TABLE 5

| Run No. | Ternary mixture (wt. percent) Polypropylene | Polyethylene | Amorphous ethylene-propylene copolymer [2] | Sodium benzenesulfonate, PHR | Izod impact strength, kg. cm./cm.$^2$ (20° C.) | Stiffness, kg./cm.$^2$ (20° C.) | Transparency [3] |
|---|---|---|---|---|---|---|---|
| 3 | 90 | 10 | 0 | 0 | 3.3 | 11,900 | Same. |
| 4 | 90 | 10 | 0 | 0.5 | 3.6 | 13,000 | Excellent. |
| 63 | 90 | 5 | 5 | 0 | 9.5 | 11,400 | Somewhat favorable. |
| 64 | 90 | 5 | 5 | 0.5 | [4] 23.8 | 13,200 | Favorable. |
| 65 | 90 | 0 | 10 | 0 | [4] 20.8 | 11,700 | Poor. |
| 66 | 90 | 0 | 10 | 0.5 | [4] 24.5 | 12,500 | Do. |
| 41 | 85 | 15 | 0 | 0 | 2.7 | 10,700 | Same. |
| 42 | 85 | 15 | 0 | 0.5 | 3.0 | 12,300 | Favorable. |
| 67 | 85 | 10 | 5 | 0 | [4] 15.2 | 10,400 | Somewhat favorable. |
| 68 | 85 | 10 | 5 | 0.5 | [4] 29.2 | 11,500 | Favorable. |
| 69 | 85 | 5 | 10 | 0 | [4] 34.3 | 10,500 | Somewhat poor. |
| 70 | 85 | 5 | 10 | 0.5 | [4] 41.4 | 11,600 | Do. |
| 71 | 85 | 0 | 15 | 0 | [4] 34.6 | 10,800 | Poor. |
| 72 | 85 | 0 | 15 | 0.5 | [4] 35.0 | 11,100 | Do. |
| 9 | 80 | 20 | 0 | 0 | 2.5 | 9,500 | Same. |
| 10 | 80 | 20 | 0 | 0.5 | 22.8 | 11,800 | Favorable. |
| 73 | 80 | 15 | 5 | 0 | [4] 12.0 | 9,800 | Somewhat favorable. |
| 74 | 80 | 15 | 5 | 0.5 | [4] 31.9 | 10,600 | Favorable. |
| 75 | 80 | 10 | 10 | 0 | [4] 46.5 | 9,300 | Somewhat poor. |
| 76 | 80 | 10 | 10 | 0.5 | [4] 53.9 | 10,300 | Do. |
| 77 | 80 | 5 | 15 | 0 | [4] 45.4 | 9,400 | Poor. |
| 78 | 80 | 5 | 15 | 0.5 | [4] 52.9 | 10,100 | Do. |
| 79 | 80 | 0 | 20 | 0 | [4] 48.0 | 9,200 | Do. |
| 80 | 80 | 0 | 20 | 0.5 | [4] 48.9 | 10,000 | Do. |

[1] Low density polyethylene having a density of 0.92 and a melt index of 1.6 at 190° C. under a load of 2,160 g.
[2] The copolymer had an ethylene content of 38.4 mol percent and an intrinsic viscosity ($\eta$) of 1.38 in tetraline solution at 135° C.
[3] Visual comparison with the polypropylene sheet of Run No. 1.
[4] In the destruction, the test piece did not peel off.

consisting of salts of metals of aromatic sulfonic acids and organic carboxylic acids, said metals belonging to Groups I, II and III of the Periodic Table.

7. A polypropylene composition according to claim 6, wherein the metals are sodium, magnesium, calcium and aluminum.

8. A polypropylene composition according to claim 6, wherein the aromatic sulfonic acids are α-naphthalenesulfonic acid, 8-aminonaphthalenesulfonic acid, benzenesulfonic acid, 2,5-dichlorobenzenesulfonic acid and m-xylenesulfonic acid.

9. A polypropylene composition according to claim 14, wherein the composition further contains a small amount of one or more additives selected from the group consisting of stabilizers, antioxidants, colorants, processing assistants and pigments.

10. A polypropylene composition having a high impact strength and rigidity in combination with transparency which comprises a ternary mixture composed of 75 to 85% by weight of a crystalline polypropylene having a melt index up to 2 at 230° C. under a load of 2160 g.; 5 to 20% by weight of a normally solid polyethylene; and 5 to 15% by weight of a substantially amorphous ethylene-propylene copolyment containing 10 to 70 mole percent on the average of bonded ethylene and having a degree of crystallinity of up to 35% and an intrinsic viscosity of at least 2.0 in tetralin at 135° C., and 0.1 to 1 part by weight, per 100 parts by weight of said ternary mixture, of at least one nucleating agent selected from the group consisting of aromatic sulfonic compounds and organic carboxylic acid compounds.

11. A polypropylene composition according to claim 10 wherein the polypropylene is prepared in the presence of a Ziegler-Natta-type catalyst and is composed mainly of propylene containing at least 50% by weight of an isotactic portion.

12. A polypropylene composition according to claim 10, wherein the polyethylene is a polymer composed mainly of ethylene and is selected from the group consisting of high density polyethylene and low density polyethylene.

13. A polypropylene composition according to claim 10, wherein the polyethylene is low density polyethylene.

14. A polypropylene composition according to claim 10, wherein the ethylene-propylene copolymer is a substantially hot-heptane-soluble polymer prepared by polymerizing a mixed gas of ethylene and propylene in the presence of a Ziegler-Natta type catalyst.

15. A polypropylene composition according to claim 10, wherein the nucleating agent is selected from the group consisting of salts of metals of aromatic sulfonic acids and organic carboxylic acids, said metals belonging to Groups I, II and III of the Periodic Table.

References Cited

UNITED STATES PATENTS

| | | | |
|---|---|---|---|
| 3,327,020 | 6/1967 | Binsbergen | 260—878 |
| 3,321,021 | 6/1967 | Binsbergen | 260—878 |
| 3,256,367 | 6/1966 | Jayne | 260—897 |

MURRAY TILLMAN, Primary Examiner

C. J. SECCURO, Assistant Examiner

U.S. Cl. X.R.

260—23, 41, 876